March 2, 1971

P. ISAAC 3,567,576

NUCLEAR REACTOR INSTALLATION

Filed April 15, 1968

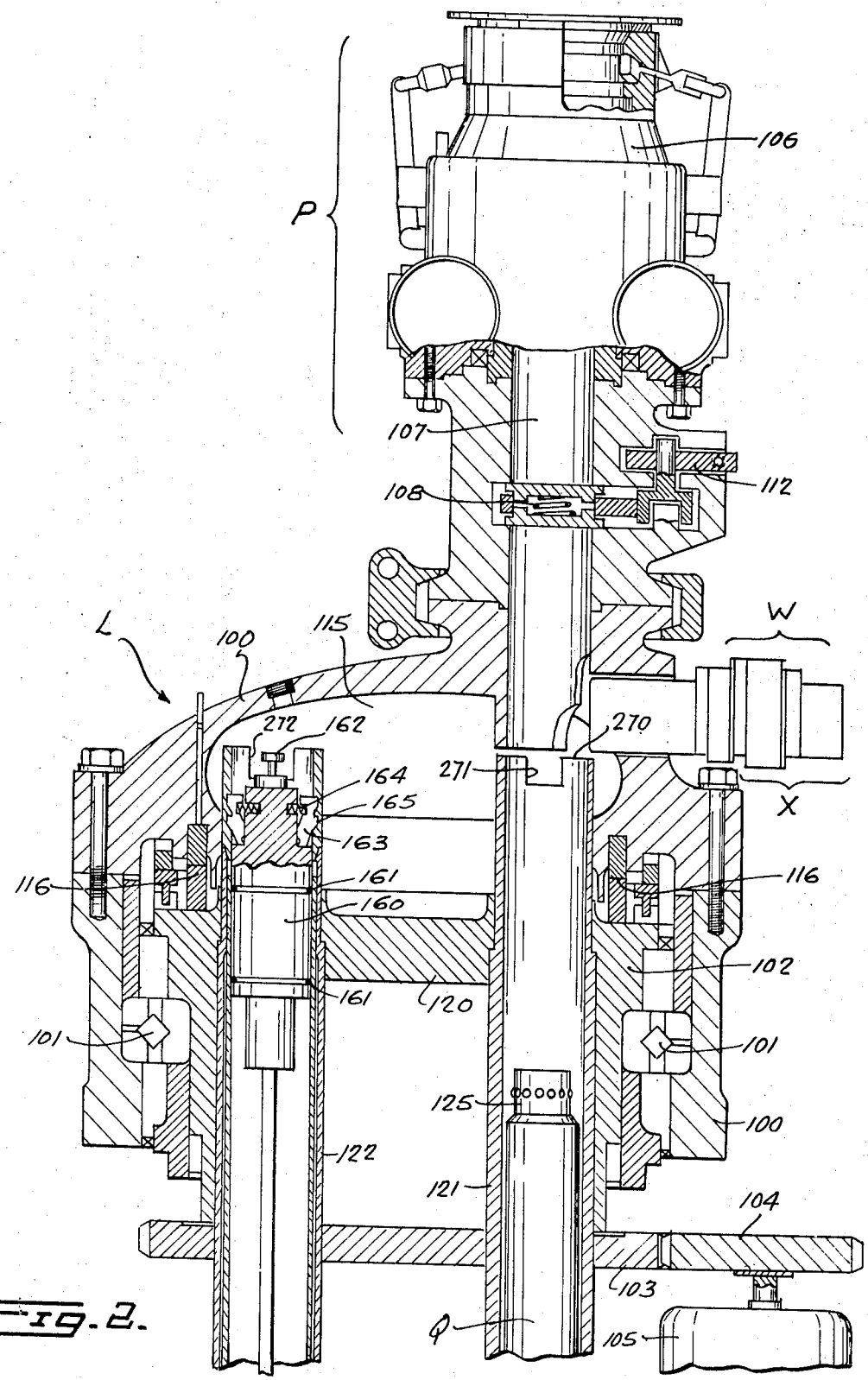

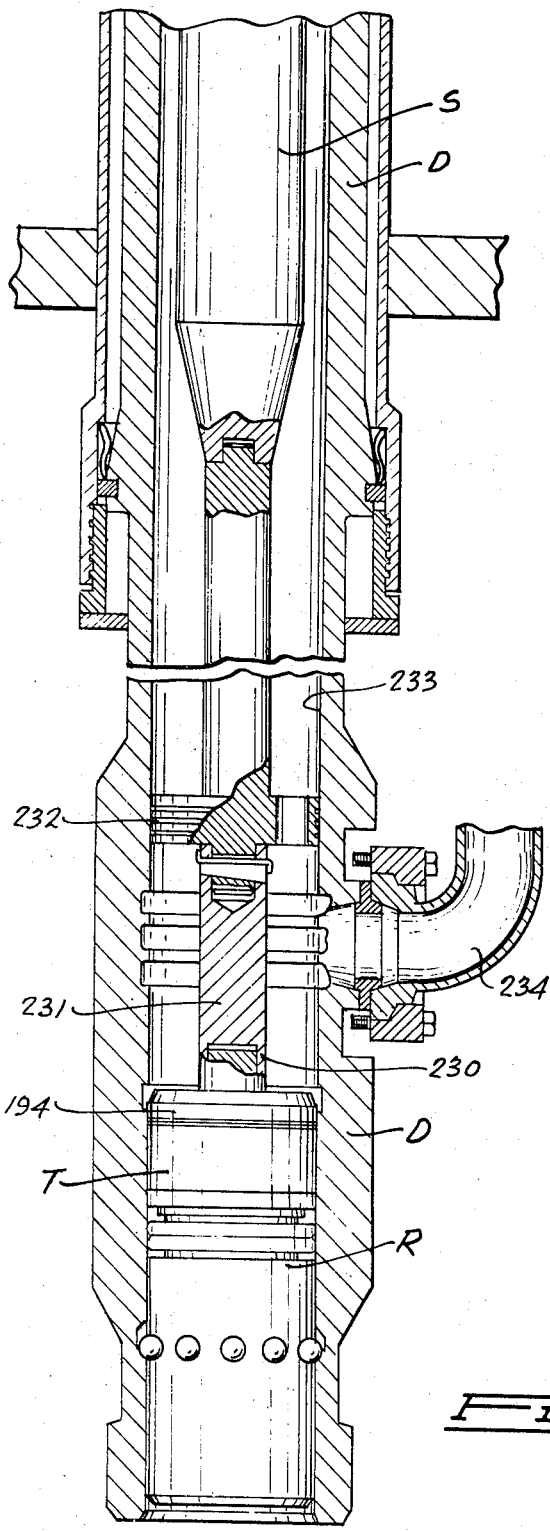
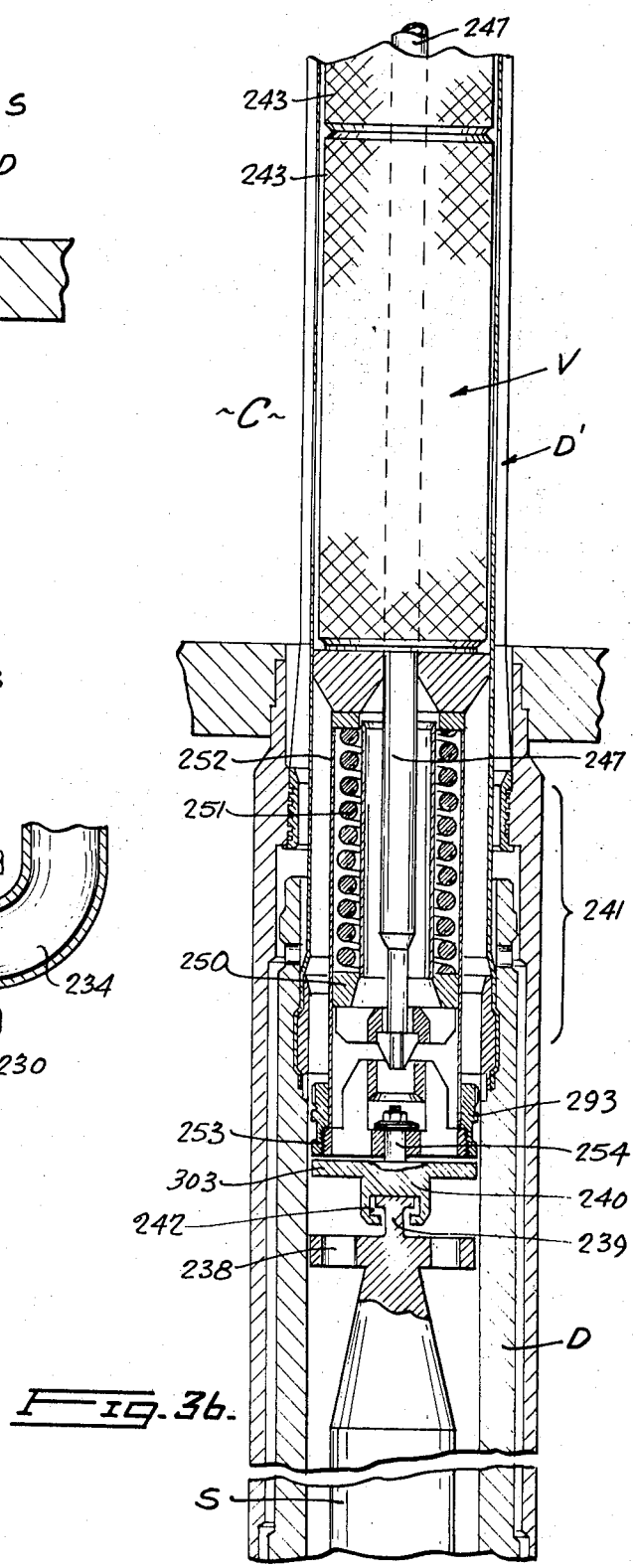

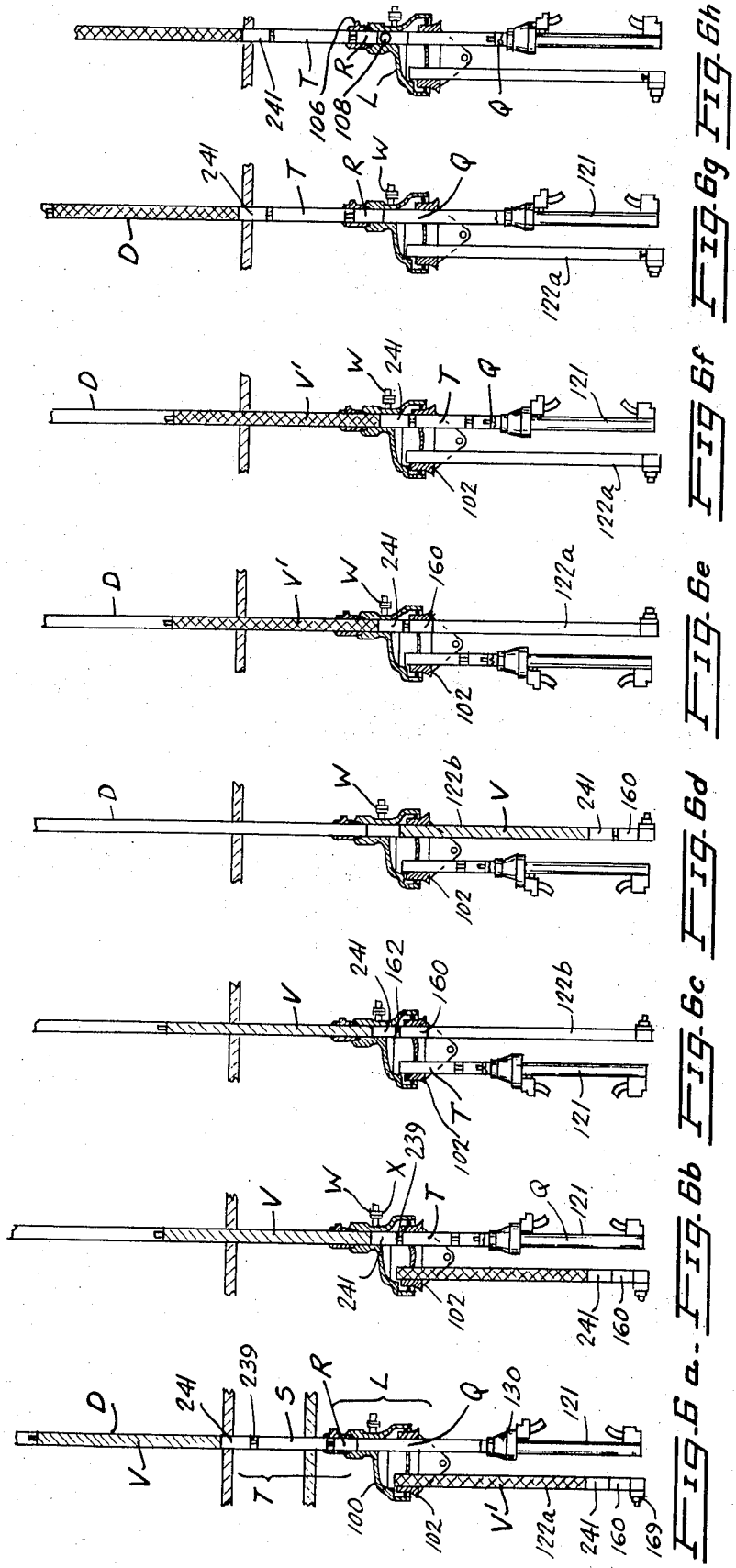

United States Patent Office 3,567,576
Patented Mar. 2, 1971

3,567,576
NUCLEAR REACTOR INSTALLATION
Peter Isaac, Cooksville, Ontario, Canada, assignor to Atomic Energy of Canada Limited, Ottawa, Ontario, Canada
Filed Apr. 15, 1968, Ser. No. 721,293
Int. Cl. G21c *19/24*
U.S. Cl. 176—30
19 Claims

ABSTRACT OF THE DISCLOSURE

A T-coupling is provided between the fuel string and the closure plug assembly together forming a fuel aggregate for loading into each reactor fuel channel. A fuelling machine comprises a minimum of two barrels, one for receiving the fuel string and one for receiving the plug assembly, the barrels being disposed in a turret rotatable about an axis parallel to the barrels and the fuel channel. Intermediate engagement or disengagement of the coupling when loading or unloading a fuel channel is made by rotating the turret.

---

Reference is made to related copending U.S. applications Ser. Nos. 721,294; 721,295; 721,358; 721,408; 721,409; and 721,410, filed Apr. 15, 1968.

The present invention relates to a nuclear reactor installation comprising a reactor, preferably of the heavy water type, and a fuelling machine for loading or unloading fuel aggregates into or from fuel channels of the reactor.

The fuel aggregates which contain the required fissionable material (e.g. uranium) have a typical length of about 30 feet, and to handle such fuel aggregates a fuelling machine is required which includes not only a container for receiving the fuel aggregate, but also a snout assembly for establishing connection with a selected fuel channel as well as mechanism for inserting the fuel aggregate into the channel or extracting it therefrom. As a result, the overall length of such a fuelling machine would have to be as much as about 36 feet. Since the overall dimensions of the building housing the reactor and the costs of the reactor installation are determined to a considerable extent by the size of the fuelling machine, it is desirable to minimise this size wherever possible. In a construction where the reactor fuel channels extend vertically, either extensive excavation or a correspondingly high building is necessary to obtain the required space either below or above the reactor vessel. With horizontally extending fuel channels, the diameter of the reactor building has to be correspondingly large. The length of the fuelling machine is a specifically significant factor in installations with horizontally extending fuel channels that are loaded by a first machine at one end and unloaded by a second machine at the other end. The basic object of the present invention is to reduce the length of the fuelling machine, which object is achieved by dividing the fuel aggregate during the loading and the unloading operations into a first portion consisting of a fuel string and a second portion consisting of a closure plug assembly. The two portions are successively inserted into (or extracted from) the selected fuel channel with intermediate engagement (or disengagement) of coupling means provided between the two portions. The length of a fuelling machine according to the invention is then determined by the longer of these portions, which will normally be the fuel string having a length about two thirds of the length of the entire fuel aggregate.

Beside such essential reduction of the fuelling machine length and thereby of the overall dimensions of the reactor installation, the present invention establishes a further advantage residing in a reduced total number of closure plug assemblies required. Since the fuel string which is being replaced is separated from the plug assembly during loading and unloading of the fuel channels, only one plug assembly is required per fuel channel rather than per fuel string.

In the present invention the fuel aggregate includes: an elongated fuel string having first coupling means at one end thereof, and an elongated plug assembly having second coupling means at one end thereof for engaging said first coupling means; and the fuelling machine includes:

first means for supporting a said fuel string, having means movable relatively to said first supporting means for displacing said fuel string along its longitudinal axis in a first direction into and from a selected said channel, second means for supporting a said plug assembly, having means movable relatively to said supporting means for displacing a said fuel aggregate in said first direction into and from said selected channel, and means for indexing said first and second supporting means relatively to said selected channel in a second direction perpendicular to said first direction to align alternately said first and second supporting means with said selected channel and to interconnect and disconnect said first and second coupling means.

Preferably, the means movable relatively to said means for supporting a fuel string include a third coupling means for engaging the first coupling means.

In a specific embodiment, the first coupling means or the second and third coupling means take the form of a slot extending substantially in the second direction and having a T-shaped cross-section, while the corresponding other coupling means take the form of a pin projecting in the first direction and having a complementary T-shaped cross-section.

Further features of the present invention will appear from the following specific description which is provided by way of example only.

In the accompanying drawings:

FIG. 2 is a section showing the upper portion of the head of the machine of FIG. 1;

FIG. 3a shows the lower portion of a reactor fuel channel with an entire closure plug therein;

FIG. 3b shows an intermediate portion of this reactor fuel channel with further parts of the plug and a part of a fuel string;

FIG. 6 consists of a series of small scale diagrammatic views *a* to *h* demonstrating a sequence of steps in a fuel unloading and reloading operation.

OVERALL ARRANGEMENT OF FUELLING MACHINE

Figure 1:
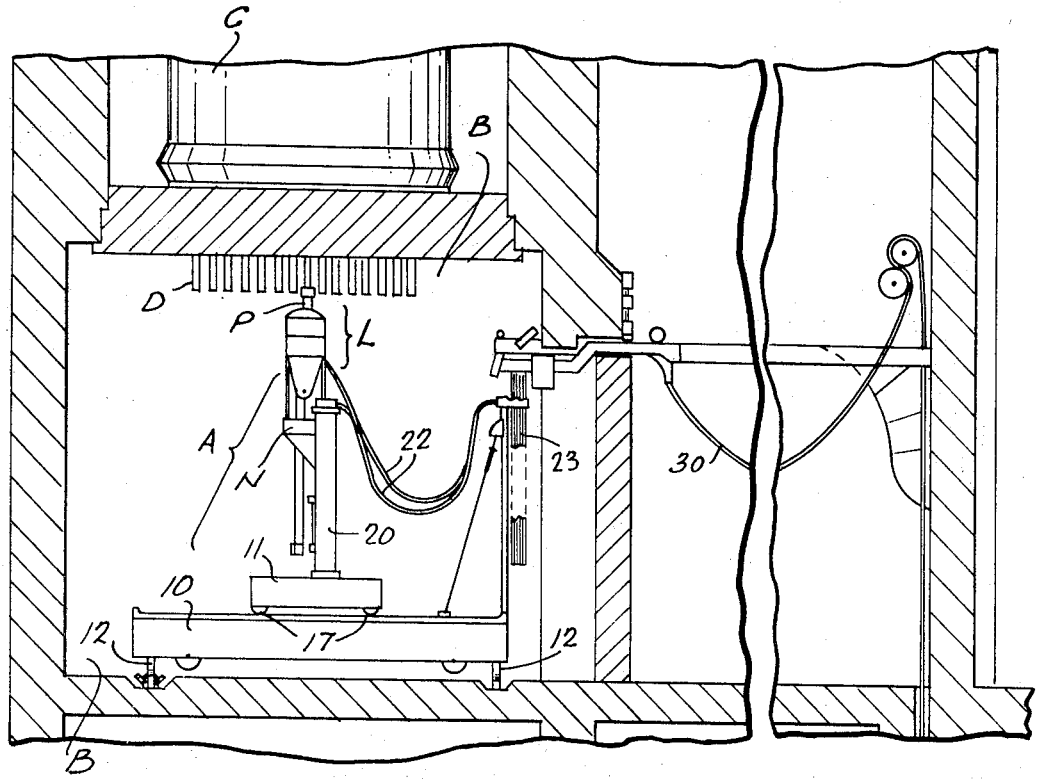
FIG. 1 is a cut-away elevation view of a fuelling machine associated with a nuclear reactor.

FIG. 1 illustrates the overall arrangement of a fuelling machine A located in a vault B beneath a nuclear reactor vessel C that has a plurality of fuel channels D that are required to be kept supplied with strings of nuclear fuel. The fuelling machine A comprises a main carriage 10 along which a trolley 11 can travel. The carriage 10 is provided with four wheels 12 for travel along the fuelling vault B in a first direction, and the trolley 11 has four wheels 17 for travel along the main carriage 10 in a second direction perpendicular to the first direction. Mounted on the trolley 11 are two upright columns 20 along which a support member N is slidable in a vertical direction. A fuelling machine head L having a snout sub-assembly P is connected to the support member N so as to be rotatable about a horizontal axis.

To couple the snout sub-assembly P to any one of the fuel channels D, the carriage 10 and the trolley 11 are moved to the appropriate location and then the machine head L is shifted upwardly to a position similar to that shown in FIG. 1.

The required fuel supply tubes (not shown) leading from the outside into the fuelling vault B may be disposed either in a vertical or a horizontal direction. In the latter case, coupling of the snout sub-assembly P to such supply tubes is performed by rotating the machine head L about 90° about its horizontal axis, shifting the head to the appropriate height and moving the trolley 11 and the carriage 10 to the appropriate location.

To carry out the required movements, the wheels 12 and 17, the supoprt member N, and the machine head L are driven by hydraulic motors (not shown) in a conventional manner. Cables 22, 23, 30 for supplying the fuelling machine with the hydraulic pressure connect the support member N to a source disposed outside the fuelling vault B.

GENERAL STRUCTURE OF THE FUELLING MACHINE HEAD

Details of the structure of the fuelling machine head L are shown in FIG. 2. The head consists of a main housing 100 that is connected to the support member N (not shown in FIG. 2) and contains a bearing assembly 101 by means of which a turret 102 is rotatably mounted in the machine head. The turret 102 carries a large toothed wheel 103 meshing with a toothed wheel 104 on the shaft of a motor 105, this motor being employed for indexing the turret 102 between various positions relative to the main casing 100, in the manner and for the purposes described below.

Rigidly connected to the housing 100 is the snout sub-assembly P including at its end a locking mechanism 106 for engaging the end of a reactor fuel channel D in the manner shown on the small scale in FIG. 1. The snout sub-assembly P also serves to define a channel 107 extending from the locking mechanism 106 to the turret 102, a shut-off valve 108 being located in such channel 107, the valve 108 being actuated by a mechanism 112. The valve 108 is shown in FIG. 2 in its closed position.

During operation, a space 115 defined within the head L will be in communication via the channel 107 with the interior of a reactor fuel channel D under high pressure. It is therefore necessary to provide the interior of the head L with means for sealing such pressure against the exterior, this being accomplished by means of a controlled leakage hydrostatic seal 116.

The turret 102 comprises a head portion 120 from which four barrels 121 and 122 extend downwardly, such barrels constituting a pair of oppositely disposed ram barrels 121 and a pair of oppositely disposed fuel barrels 122 arranged intermediate the ram barrels.

In each of the fuel barrels 122 there is slidably mounted a free piston 160 having seals 161 encircling its perimeter. At its forward end the piston 160 has a projecting pin 162 of T-shaped cross-section and at an intermediate location it carries pivoted mechanical stops 163 that are urged radially outwardly by springs 164 into engagement with cavities 165 in the barrel 122. The stops 163 and cavities 165 are shaped to prevent the piston 160 moving upward from the position shown, while leaving it free to move downward.

The barrel 122 serves as a hydraulic cylinder, and conventional valve means 169 (FIG. 6a) are provided to control the liquid pressure in the barrel 122 thereby moving the piston 160 upwards and downwards. The front end of each fuel barrel 122 is provided with two slots 272.

Each ram barrel 121 houses a ram mechanism Q comprising a ram head 125 movable upwards and downwards by means of a hydraulic drive unit 130 (FIG. 6a). The front end 270 of each ram barrel 121 is provided with two slots 271. All slots 271 and 272 in the barrels 121, 122 are disposed on a circle concentric to the axis of rotation of the turret 102.

The snout sub-assembly P termintes at its upper end in the locking mechanism 106, the structural details of which are described in Canadian Hummel Pat. No. 738,540 issued July 12, 1966 and in the corresponding U.S. Pat. No. 3,169,909 issued Feb. 16, 1965. After this locking mechanism 106 has engaged one of the fuel channels D, as shown in FIG. 1, the ram head 125 is shifted upwards and coupled to a plug assembly T (FIG. 3a) connected to the lower end of an associated fuel string V (FIG. 3b).

GENERAL STRUCTURE OF FUEL STRING WITH CLOSURE PLUG

FIGS. 3a and 3b show the lower portion of a fuel channel D with the plug assembly T including a closure plug R and a shield plug S, which reduces neutron loss from the reactor, as well as the fuel string V in normal operating position, and also show the manner in which the lower end 230 of a rod 231 is fixed to the upper member 194 of the plug R. Rod 231 forms the lower extremity of the shield plug S which includes an orifice plate 232 the periphery of which is adapted to slide along the inner wall 233 of the reactor fuel channel D. A pipe 234 represents an entrance for coolant water into the channel D and along the channel into the reactor vessel proper. The upper end of the shield plug S terminates in a guide plate 238 and a T-pin 239 that engages a corresponding T-slot 242 in an end member 240 of a tensioning mechanism 241 mounted on the end of the fuel string V located in the active portion here designated D' of the reactor fuel channel D, namely the portion that extends through the reactor vessel C iself. The fuel string V consists of a series of separate fuel bundles 243, each bundle consisting of a series of parallel arranged, clad fuel elements rigidly joined together into a string by means of a tube 247. The tube 247 extends along the entire fuel string V, having its lower end connected to an end member 250 in the tensioning mechanism 241. The member 250 is urged downwardly by the lower end of a spring 251, the upper end of which acts against the casing 252 of the tensioning mechanism 241. The casing 252 is connected through an orifice plate 253 and a bolt 254 to the end member 240. The spring 251 thus places the tube 247 in tension and, acting against a retainer (not shown) at the other end of the string V, holds the individual fuel bundles 243 of the string V tightly pressed together longitudinally as well as connected to the plug S, so that when the closure plug R is withdrawn from the fuel channel D the entire plug assembly R and S and the entire fuel string V follow. The manner in which these parts are thus withdrawn into the fuelling machine is described below.

STOP MECHANISM

Figure 4:
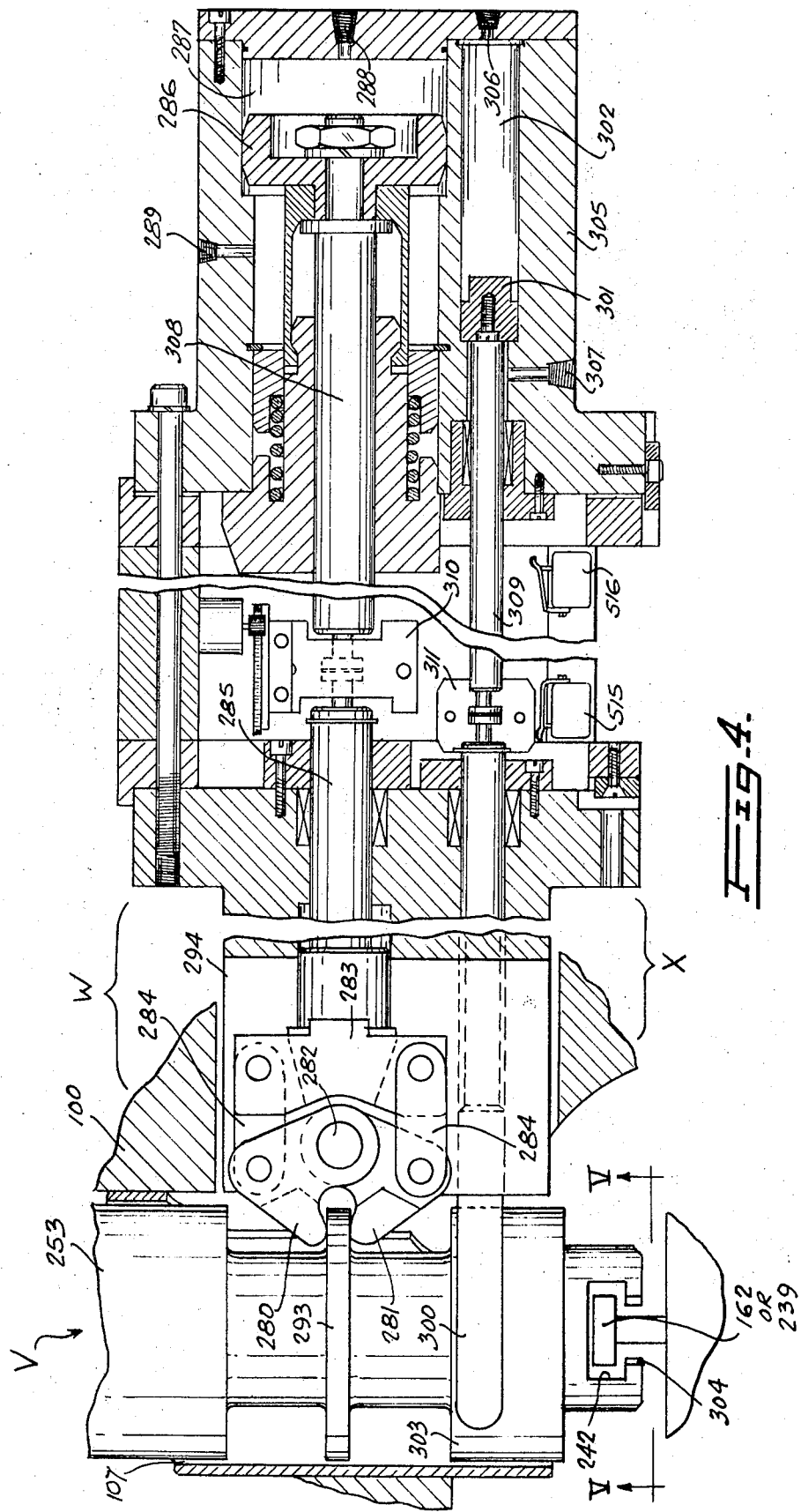
FIG. 4 is a partially cut-away enlarged view of a locking mechanism, this view being a fragment of FIG. 2, but with a part of the closure plug shown in place.

FIG. 4 shows a stop mechanism W that is provided in the main housing 100 of the machine head L as indicated in FIG. 2. This mechanism comprises a pair of detents 280 and 281 mounted on a pin 282 to be pivoted in opposite directions by sliding movement of a yoke 283 the ends of which are connected by links 284 to the inner ends of respective detents 280, 281. The centre of the yoke 283 is connected by a rod 285 to a piston 286 in a cylinder 287, to either side of which a differential pressure can be applied through a passage 288 or 289. In FIG. 4, the stop mechanism W is shown in its operative position, in which the detents 280, 281 engage opposite surfaces of an annular projection 293 formed near the lower end of the fuel string tensioning mechanism 241 (see FIG. 3b). As can be readily visualised, movement of the piston 286 to the right will rotate each of the detents 280, 281 in a direction to withdraw its stop surfaces back into a cavity 294 in the housing 100 and thus out of contact with any elements in the channel 107. It will be appreciated that the stop mechanism W will thus serve to locate the fuel string V with the tensioning mechanism 241 accurately in the longitudinal direction, when the ram mechanism Q has withdrawn the plug assembly.

ALIGNMENT MECHANISM

Figure 5:
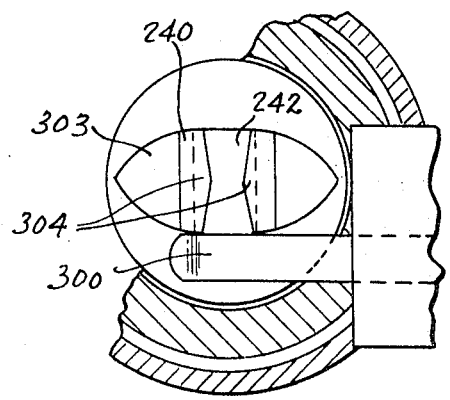
FIG. 5 is a section on the line V—V in FIG. 4.

Mounted together with the stop mechanism W is an alignment mechanism X which comprises essentially a slide member 300 controlled by a piston 301 and adapted to cooperate, when moved out into the projecting position shown in FIGS. 4 and 5, with a cam 303 formed on the end of the tensioning mechanism 241. Should the cam 303 not be oriented in the rotational position shown in FIG. 5 when the slide member 300 is moved out, it will be turned to this orientation thus aligning the slot 242 for movement in and out thereof of either the T-pin 239 on the end of the plug assembly T or the T-pin 162 on the piston 160 upon indexing movement of the turret 102.

The piston 301 is movable in a cylinder 302 provided in the same member 305 and adjacent to the cylinder 287, in either direction depending on whether a higher differential pressure is applied to the cylinder 302 by a passage 306 or a passage 307.

The slide member 300 is connected to the piston rod 309 by a coupling 311 which additionally serves as a cam member for actuating a position switch 515 in the fully extened position shown in FIG. 4 or a position switch 516 in the fully retracted position of the piston 301.

The space 294 of the combined mechanism is in communication with the space 115 (FIG. 2) within the fuelling machine head L and hence operates in water. The remaining portion of the mechanism including the pistons 286 and 301 and associated piston rods 308 and 309 forms a unit operating in oil hydraulics, which can be detached from the portion enclosing the space 294 without draining water from the fuelling machined head L, by releasing the coupling 311 and a similar coupling 310 between the piston rod 308 and the rod 285.

Theoretically, there are two radial positions on the cam 303 in which the actuating slide member 300 would not be able to transmit a turning movement onto the cam. In practice, it has been demonstrated that reactuation of the piston 301 will be sufficient to overcome this problem, should it present itself.

It will be noted that the slot 242 is formed with inwardly converging end walls 304 to facilitate entry of either of the T-pins 162, 239 into this engagement.

FUEL UNLOADING AND RELOADING PROCEDURE

FIG. 6 shows in a series of small scale views designated a to h, the principal steps in a fuel unloading and reloading operation. FIG. 6a shows a reactor fuel channel D containing the plug assembly T which is connected to the tensioning mechanism 241 on the end of a fuel string V by means of the T-pin 239. It is assumed that the fuel string V consists of at least partly spent fuel and is to be removed from channel D and replaced by a fresh fuel string V' which is stored in a first one of the two fuel barrels 122 (here designated 122a) of the fuelling machine head L. One of the ram barrels 121 is aligned with the channel D and the ram mechanism Q has been advanced to release the closure plug R.

The ram mechanism Q is now fully withdrawn (FIG. 6b), which action has the effect of drawing the plug assembly T down into the barrel 121 in such a manner as to align its T-pin 239 with the extreme end 270 (FIG. 2) of the barrel 121. In the manner described the mechanism X in the machine head L now ensures alignment of the open sides of the T-slot 242 of the tensioning mechanism 241 at the end of the fuel string V with the circumferential direction of movement of the turret 102. At this time, the mechanism W locks the fuel string temporarily in this position. The circumferential alignment together with the fact that the fuel string cannot at this time move longitudinally permits the turret 102 to be indexed through 90°, which action is now carried out (FIG. 6c), with the effect that the T-pin 239 on the upper end of the plug assembly T is moved sideways out of its formed engagement with the T-slot 242 and is replaced by the T-pin 162 on the end of the piston 160 in the other of the fuel barrels 122b, which second fuel barrel is empty at this time. During this rotation, the end member 240 of the fuel string V containing the T-slot 242 passes through the respective one of the slots 271 at the end 270 of the ram barrel 121 as well as through one of the slots 272 at the front end of the fuel barrel 122b (FIG. 2).

The next step (FIG. 6d) is to extract the fuel string V from the channel D and draw it down into the fuel barrel 122b, and this effect is achieved by a gradual reduction of liquid pressure in the barrel 122b behind the piston 160.

The turret 102 is now indexed around by 180° to bring the fuel barrel 122a containing the fresh fuel string V' into register with the channel D, whereupon sufficient pressure is applied behind the piston 160 in the barrel 122a to force it to move upwardly against the liquid pressure in the channel itself, thus moving the fuel string V' into the channel D (FIG. 6e). With the new string locked in this position, the turret 102 is now again indexed through 90° to return the ram barrel 121 to alignment with the channel D (FIG. 6f), and thus connect the plug assembly T stored in the barrel 121 to the tensioning mechanism 241 of the new fuel string V'. The ram mechanism Q is then advanced to reinsert the plug assembly T with the fuel string V' attached thereto into the channel D (FIG. 6g).

Finally, the closure plug R is replaced in the end of the channel D and the ram mechanism is retracted (FIG. 6h).

The liquid pressure inside the machine head L is then reduced, the shut-off valve 108 closed and locking mechanism 106 of the machine head L released in order to disengage the fuelling machine head from the particular channel D that has been refuelled.

I claim:
1. A nuclear reactor installation, comprising a reactor and a fuelling machine for loading and unloading fuel aggregates into and from channels of said reactor, a said fuel aggregate including:
   (a) an elongated fuel string having first coupling means at one end thereof, and
   (b) an elongated plug assembly having second coupling means at one end thereof for engaging said first coupling means;
said fuelling machine including:
   (c) first means for supporting a said fuel string, having means movable relatively to said first supporting means for displacing said fuel string along its longitudinal axis in a first direction into and from a selected said channel,
   (d) second means for supporting a said plug assembly, having means movable relatively to said second supporting means for displacing a said fuel aggregate in said first direction into and from said selected channel, and
   (e) means for indexing said first and second supporting means relatively to said selected channel in a second direction perpendicular to said first direction to align alternately said first and second supporting means with said selected channel and to interconnect and disconnect said first and second coupling means.

2. A nuclear reactor installation, comprising a reactor and a fuelling machine for loading fuel aggregates into channels of said reactor, a said fuel aggregate including:
   (a) an elongated fuel string having first coupling means at one end thereof, and
   (b) an elongated plug assembly having second coupling means at one end thereof for engaging said first coupling means;
said fuelling machine including:

(c) first means for supporting a said fuel string, (d) means movable relatively to said first supporting means for displacing said fuel string along its longitudinal axis in a first direction into a selected said channel, (e) means for maintaining said fuel string at a selected location in said selected channel, (f) second means for supporting a said plug assembly, (g) means for indexing said first and second supporting means relatively to said selected channel in a second direction perpendicular to said first direction to align the longitudinal axes of said plug assembly supported on said second supporting means and of said fuel string maintained at said selected location and to interconnect said first and second coupling means to form a said fuel aggregate, and (h) means movable relatively to said second supporting means for inserting said fuel aggregate in said first direction into said selected channel.

3. An installation as in claim 2, wherein said means movable relatively to said first supporting means include third coupling means for engaging said first coupling means.

4. An installation as in claim 2 wherein one of said first and second coupling means comprises a slot extending substantially in said second direction and having a T-shaped cross-section, and wherein the other coupling means comprises a pin projecting in said first direction and having a T-shaped cross-section complementary to said slot cross-section.

5. An installation as in claim 4, wherein said indexing means comprises a turret containing said first and second supporting means and means for rotating said turret about an axis parallel to said first direction.

6. An installation as in claim 4, wherein said slot has side-walls converging in said second direction from both ends towards the center of the slot.

7. An installation as in claim 4, further comprising positioning means for aligning said slot with said second direction.

8. An installation as in claim 7, wherein said positioning means comprise a cam mounted on the part that is provided with said slot, and a reciprocable slide member including means for moving said slide member to engage said cam.

9. A nuclear reactor installation, comprising a reactor and a fuelling machine for unloading fuel aggregates from channels of said reactor, a said fuel aggregate including:

(a) an elongated fuel string having first coupling means at one end thereof, and (b) an elongated plug assembly having second coupling means at one end thereof for engaging said first coupling means;

said fuelling machine including:

(c) first means for supporting a said plug assembly, (d) means movable relatively to said first supporting means for extracting said plug assembly along its longitudinal axis in a first direction from a selected said channel, (e) means for maintaining the fuel string coupled to said plug assembly at a selected location in said selected channel, (f) second means for supporting said fuel string, (g) means having third coupling means for engaging said first coupling means, (h) means for indexing said first and second supporting means relatively to said selected channel in a second direction perpendicular to said first direction to disconnect said first and second coupling means, to align the longitudinal axis of said fuel string maintained at said selected location with said second supporting means and to interconnect said first and third coupling means, (i) said means (g) being movable relatively to said second supporting means to extract said fuel string from said selected channel in said first direction.

10. An installation as in claim 9, wherein one of said first and second coupling means comprises a slot extending substantially in said second direction and having a T-shaped cross-section, and wherein the other coupling means comprises a pin projecting in said first direction and having a T-shaped cross-section complementary to said slot cross-section.

11. An installation as in claim 10 wherein said indexing means comprise a turret containing said first and second supporting means and means for rotating said turret about an axis parallel to said first direction.

12. An installation as in claim 10, wherein said slot has side-walls converging in said second direction from both ends towards the center of the slot.

13. An installation as in claim 10, further comprising positioning means for aligning said slot with said second direction.

14. An installation as in claim 13, wherein said positioning means comprise a cam mounted on the part that is provided with said slot, and a reciprocable slide member including means for moving said slide member to engage said cam.

15. A nuclear reactor installation, comprising a reactor and a fuelling machine for loading and unloading fuel aggregates into and from channels of said reactor, a said fuel aggregate including:

(a) an elongated fuel string having first coupling means at one end thereof, and (b) an elongated plug assembly having second coupling means at one end thereof for engaging said first coupling means, one of said first and second coupling means including a substantially T-shaped pin having its stem extending along the longitudinal axis of said fuel aggregate and the other coupling means including a correspondingly shaped slot extending in a direction perpendicular to said longitudinal axis;

said installation further comprising (c) positioning means for aligning said slot with a predetermined direction, and (d) means for moving said plug assembly relatively to said fuel string in said predetermined direction for engaging and disengaging said pin and said slot.

16. An installation as in claim 15, wherein said positioning means are located in said fuelling machine.

17. An installation as in claim 15, wherein said positioning means comprises a cam mounted on the part of the fuel aggregate that is provided with said slot, and a reciprocable slide member including means for moving said slide member to engage said cam.

18. An installation as in claim 17, wherein said means for moving the slide member comprises a hydraulic cylinder.

19. An installation as in claim 17, wherein said positioning means further comprises means indicating the position of said slide member.

References Cited

UNITED STATES PATENTS 3,300,389    1/1967    Packman et al.    176—32
3,340,154    9/1967    Sinclair et al.    176—30

CARL D. QUARFORTH, Primary Examiner

H. E. BEHREND, Assistant Examiner

U.S. Cl. X.R.

176—87, 32; 214—18